United States Patent
Worthington et al.

(10) Patent No.: US 7,582,131 B2
(45) Date of Patent: Sep. 1, 2009

(54) PLASTIC SUPPORT NET FOR FILTER MEDIA

(75) Inventors: Chris E. Worthington, Saint Paul, MN (US); Christopher P. Hakanson, Woodbury, MN (US); Keith E. Misukanis, Eagan, MN (US)

(73) Assignee: Conwed Plastics LLC, Minneapolis, MN (US)

(*) Notice: Subject to any disclaimer, the term of this patent is extended or adjusted under 35 U.S.C. 154(b) by 272 days.

(21) Appl. No.: 11/562,494

(22) Filed: Nov. 22, 2006

(65) Prior Publication Data

US 2007/0107393 A1 May 17, 2007

Related U.S. Application Data

(63) Continuation-in-part of application No. 11/531,847, filed on Sep. 14, 2006.

(60) Provisional application No. 60/717,514, filed on Sep. 15, 2005.

(51) Int. Cl.
*B01D 46/52* (2006.01)

(52) U.S. Cl. .............. 55/501; 55/499; 55/521; 55/DIG. 5; 210/493.1

(58) Field of Classification Search .......... 55/486, 55/487, 499, 501, 521, DIG. 5; 29/896.62; 264/211.12, 285, 286; 210/493.1, 493.3, 210/493.5, 499
See application file for complete search history.

(56) References Cited

U.S. PATENT DOCUMENTS

| | | | |
|---|---|---|---|
| 3,695,012 A | 10/1972 | Rolland | |
| 3,700,521 A | 10/1972 | Gaffney | |
| 3,723,218 A | 3/1973 | Gaffney | |
| 3,767,353 A | 10/1973 | Gaffney | |
| 3,853,529 A * | 12/1974 | Boothe et al. | 55/499 |
| 4,123,491 A | 10/1978 | Larsen | |
| 4,140,826 A | 2/1979 | Liu | |
| 4,152,479 A | 5/1979 | Larsen | |
| 4,190,692 A | 2/1980 | Larsen | |
| 4,257,791 A * | 3/1981 | Wald | 55/382 |
| 4,290,889 A * | 9/1981 | Erickson | 210/484 |
| 4,410,587 A | 10/1983 | Fair et al. | |
| 4,464,263 A | 8/1984 | Brownell | |
| 4,470,942 A | 9/1984 | Beretta | |
| 4,478,620 A * | 10/1984 | Tamura | 55/486 |
| 4,656,075 A | 4/1987 | Mudge | |
| 4,755,247 A | 7/1988 | Mudge | |
| 4,756,946 A * | 7/1988 | Mercer | 428/136 |
| 5,269,631 A | 12/1993 | Mercer et al. | |
| 5,744,036 A | 4/1998 | Choi | |

(Continued)

*Primary Examiner*—Duane Smith
*Assistant Examiner*—Robert A Clemente
(74) *Attorney, Agent, or Firm*—Brooks Kushman P.C.

(57) ABSTRACT

According to one aspect of the present invention, a filter assembly for removing particulate matter from a fluid stream is disclosed. The filter assembly includes a filter medium having a number of longitudinally extending spaced pleats. Opposing faces of adjacent pleats form a valley therebetween and include a pair of peak portions and a valley portion. The filter assembly further includes a plastic support net being pleated for supporting the filter medium in a pleated shape. The plastic support net includes spaced strands extending in a first direction and spaced strands extending in a second direction that is generally transverse the first direction. The strands extending in the first direction continuously extend over the valley and peak portions of opposing faces of adjacent filter medium pleats and are aligned in a direction substantially perpendicular to the longitudinal direction of the filter medium pleats.

23 Claims, 3 Drawing Sheets

U.S. PATENT DOCUMENTS

| | | | |
|---|---|---|---|
| 5,753,337 A | 5/1998 | Slocumb | |
| 5,800,585 A | 9/1998 | Choi | |
| 5,810,898 A * | 9/1998 | Miller | 55/501 |
| 5,888,262 A | 3/1999 | Kahler | |
| 5,968,373 A * | 10/1999 | Choi | 210/806 |
| 6,045,597 A | 4/2000 | Choi | |
| 6,056,809 A * | 5/2000 | Chapman | 96/67 |
| 6,165,241 A * | 12/2000 | Choi | 55/521 |
| 6,409,864 B1 | 6/2002 | Choi | |
| 6,652,613 B2 | 11/2003 | Shah et al. | |
| 6,723,150 B2 | 4/2004 | Parker | |
| 6,814,773 B2 | 11/2004 | Shah et al. | |
| 6,991,112 B2 | 1/2006 | Ham | |
| 2002/0089084 A1 | 7/2002 | Kandel | |
| 2006/0151630 A1 | 7/2006 | Joseph et al. | |
| 2006/0157589 A1 | 7/2006 | Joseph et al. | |

\* cited by examiner

PLASTIC SUPPORT NET FOR FILTER MEDIA

CROSS-REFERENCE TO RELATED APPLICATIONS

This application is a continuation-in-part and claims priority to U.S. application Ser. No. 11/531,847 filed on Sep. 14, 2006, which claims the benefit of U.S. provisional application Serial No. 60/717,514 filed Sep. 15, 2005, which are both incorporated herein by reference.

BACKGROUND OF THE INVENTION

1. Field of the Invention

One aspect of the present invention is directed at plastic support net for filter media.

2. Background Art

Filter medium is often subjected to a pleating operation to form pleated filter material having a greater filtration surface area than the unpleated filter medium. The increased filtration surface area allows the pleated filter medium to remove a relatively higher amount of particulates, e.g. dirt and dust, from a fluid flow, e.g. air, through the filter medium. Moreover, pleating the filter medium reduces the face velocity of the fluid across the medium, thereby reducing pressure drop and/or energy use.

Many pleated filter medium require a support structure to hold the filter material in a pleated shape, thereby maintaining the increased filtration surface area. Typically, a filter medium assembly is made using the following process: (1) a relatively flat support structure is layered onto a flat filter medium, or vice versa, to obtain a flat filter assembly; and (2) the flat filter assembly is subsequently pleated to obtain a pleated filter assembly. For many filter medium, step (2) is carried out at ambient temperatures because an elevated temperature pleating process may damage the filter medium material and/or ambient temperature pleating can be less expensive and/or more efficient than elevated temperature pleating.

Currently, metal mesh materials are utilized as pleated support structures that can be formed at ambient temperatures. While metal mesh materials have this advantage, pleated filter assemblies formed with such support material cannot be fully incinerated because of the metal mesh support material. Moreover, the sharp points and edges formed while pleating the metal mesh material can be difficult to handle. Furthermore, metal mesh is susceptible to rusting and corrosion.

Alternatively, polypropylene (PP) has been utilized as an incinerable pleated filter support material. However, polypropylene must be pleated at an elevated temperature to take and hold a pleat, which can cause damage to heat sensitive filter medium materials. For example, the filter medium can be made of a mixture of PP and polyethylene (PE) fibers, which is processed in a heated through-air bonder machine to tackify and melt the PE fibers, thereby consolidating the nonwoven filter medium material. Further heating during a pleating operation can degrade the filtration characteristics of the medium. Other examples of filter support materials that are heated to take on a pleat include nylons and polyesters used with hydrocarbon liquid filter medium. As with the PP/PE mixture filter medium example, heating of the hydrocarbon liquid filter medium during the pleating operation can degrade the filtration characteristics of the filter medium.

In light of the foregoing, what is needed is a support structure for supporting filter media that overcomes one or more of the shortcomings identified above. What is further needed is a pleated filter assembly and method of forming the same under ambient conditions that overcome one or more of the shortcomings identified above.

SUMMARY OF THE INVENTION

According to one embodiment of the present invention, a filter assembly for removing particulate matter from a fluid stream is disclosed. The filter assembly includes a filter medium having a number of longitudinally extending spaced pleats. Opposing faces of adjacent pleats form a valley therebetween and include a pair of peak portions and a valley portion. The filter assembly further includes a plastic support net being pleated for supporting the filter medium in a pleated shape. The plastic support net includes spaced strands extending in a first direction and spaced strands extending in a second direction that is generally transverse to the first direction. The spaced strands extending in the first direction continuously extend over the valley and peak portions of opposing faces of adjacent filter medium pleats and are aligned in a direction generally perpendicular to the longitudinal direction of the filter medium pleats.

According to another embodiment of the present invention, a method for forming a pleated filter assembly is disclosed. The method includes providing a generally planar plastic net adjacent to a generally planar filter medium to obtain a generally planar filter assembly, and pleating the generally planar filter assembly at an ambient temperature to obtain a pleated filter assembly including a pleated filter medium for removing particulate matter from a fluid stream and having pleats extending in a longitudinal direction and a direction generally perpendicular to the longitudinal direction and a pleated plastic support net for holding the pleated filter medium in a pleated shape.

DETAILED DESCRIPTION OF THE PREFERRED EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Figure 1A:
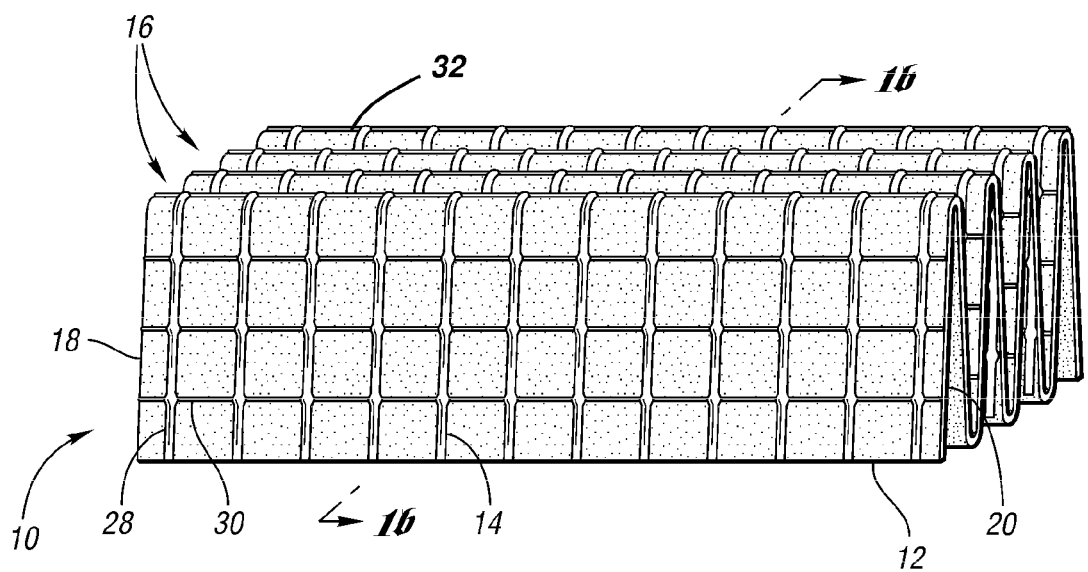
FIG. 1a is a perspective view of a filter assembly according to an embodiment of the present invention.
Figure 1B:
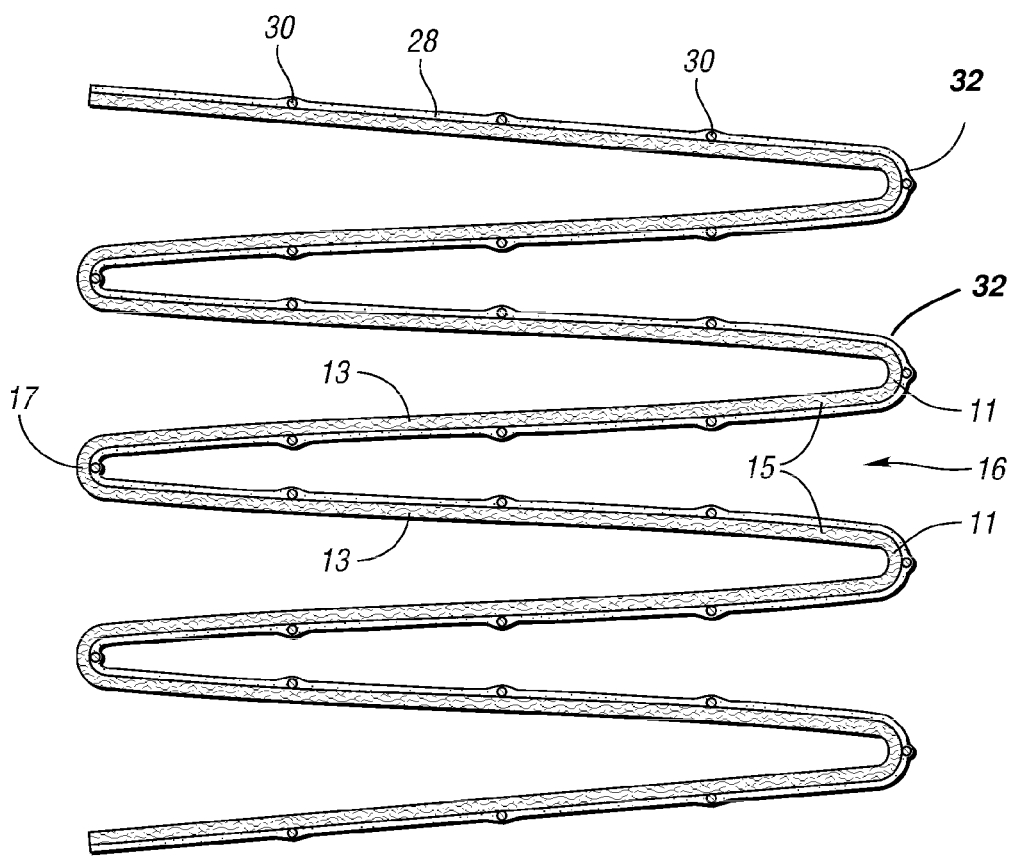
FIG. 1b is a cross sectional view of the filter assembly of FIG. 1A taken along line 1b-1b.

FIGS. 1a and 1b depict perspective and cross-sectional views of a filter assembly 10 according to one embodiment of the present invention. The filter assembly 10 includes a pleated filter medium 12 for removing particulates from a fluid stream and a pleated support net 14 for supporting the pleated filter medium 12 in a pleated shape. The pleated filter medium 12 can be made of any material suitable for removing particulates from a fluid stream, while allowing the flow of the filtered fluid through the pleated filter medium 12. Non-limiting examples of suitable materials include paper, cellulose, cotton and other natural fibers, synthetic fibers made of polypropylene, polyethylene, polyesters and other polymers, fiberglass, and mixtures thereof.

The pleated filter medium 12 can be formed from a generally planar filter medium by any method known to those skilled in the art, including, but not limited to, the use of a pleating machine to form a number of longitudinally extending spaced pleats 11 from the generally planar filter medium. Non-limiting examples of pleating machines include push bar, rotary gear, star gear and knife pleaters. Opposing faces 13 of adjacent filter medium pleats 11 form a valley 16 therebetween. The opposing faces 13 also include a pair of peak portions 15 and a valley portion 17. The pleats 11 extend in a longitudinal direction between generally parallel opposing pleat ends 18 and 20. The longitudinal dimension of each pleat can be in the range of 12, 24 or 36 to 48, 60 or 72 inches. The valley depths of the pleats can be in the range of 0.5, 0.75 or 1 to 4, 6 or 12 inches.

The pleated support net 14 can be formed by any method known to those skilled in the art. For example, a generally planar net can be formed by a continuous extrusion of individual strands to obtain an interconnecting network of machine direction (MD) and cross direction (CD) strands to provide a net-like structure. The CD strands extend generally transverse to the MD strands. U.S. Pat. Nos. 3,700,521; 3,767,353; 3,723,218; 4,123,491; 4,152,479 and 4,190,692 show non-limiting examples of apparatuses and methods for making nets by continuous extrusion of individual plastic strands. The disclosures of the above-mentioned issued patents are incorporated by reference into the present application. Once the generally planar net is formed, the pleated support net 14 can be formed by any method known to those skilled in the art, including, but not limited to, the use of a crimping machine to form the pleated structure of the net 14.

In at least one embodiment, the pleated filter medium 12 and pleated support net 14 are formed in a single forming step. For instance, a generally planar net is placed adjacent to one of the opposing faces of a generally planar filter medium. In certain embodiments, the generally planar net and generally planar filter medium can be coupled to each other with an adhesive before or during the pleating operation. This layered generally planar assembly is then pleated according to any method known to those skilled in the art, such as a crimping method.

In at least one embodiment, the filter medium includes two or more sub-layers sandwiched together to form the filter medium. In such embodiments, the plastic support net can be incorporated between two adjacent sub-layers of the filter medium.

The pleated support net 14 includes spaced strands 28 extending in a first direction and spaced strands 30 extending in a second direction that is generally transverse to the first direction. The spaced strands 30 provide support to the pleats in a primarily longitudinal direction while spaced strands 28 provide support to the pleats in a primarily perpendicular direction to the longitudinal direction of the pleats. The strands 28 extend over the peak portions 32 of the opposing faces of adjacent pleats, thereby providing holding strength in the primarily perpendicular direction of the pleats in such portions. The combination of strands 28 and 30 provide sufficient support strength to the pleated filter medium 12 such that the pleated shape is maintained during the use of the pleated filter medium 12.

Figure 2:
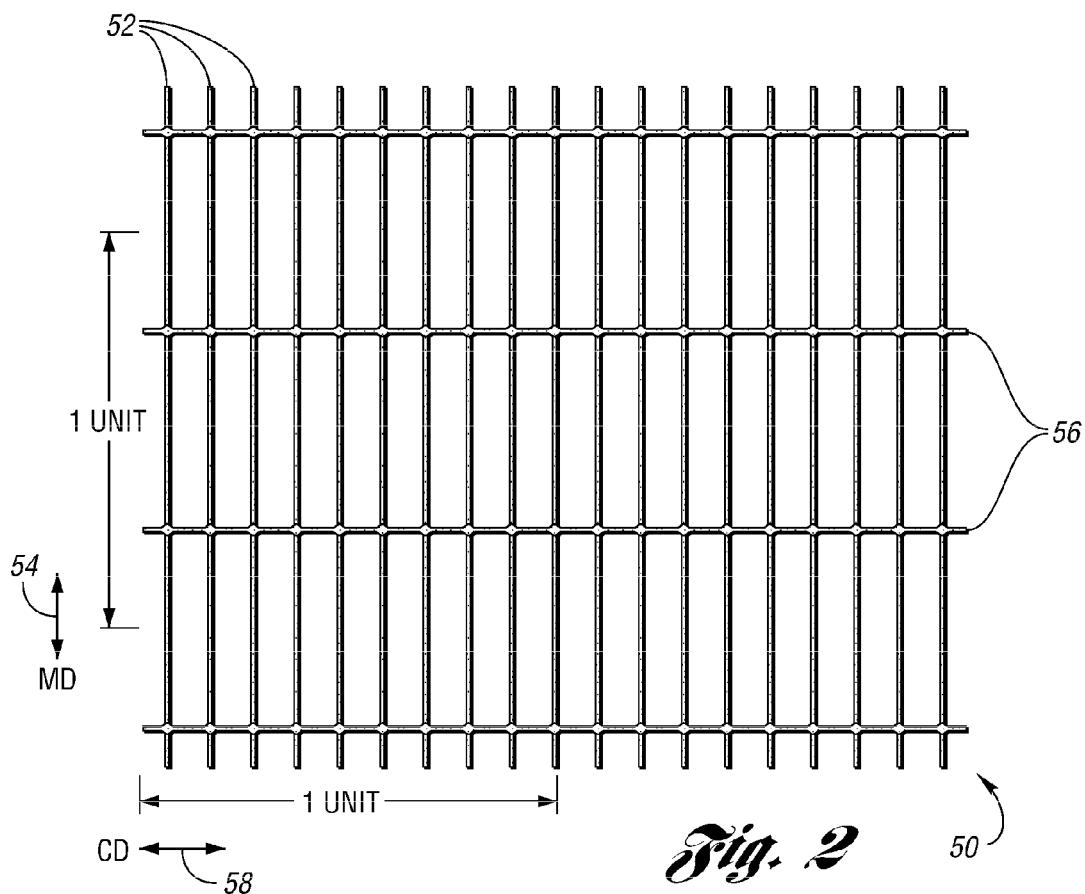
FIG. 2 is a top view of an unoriented plastic net according to an embodiment of the present invention.
Figure 3:
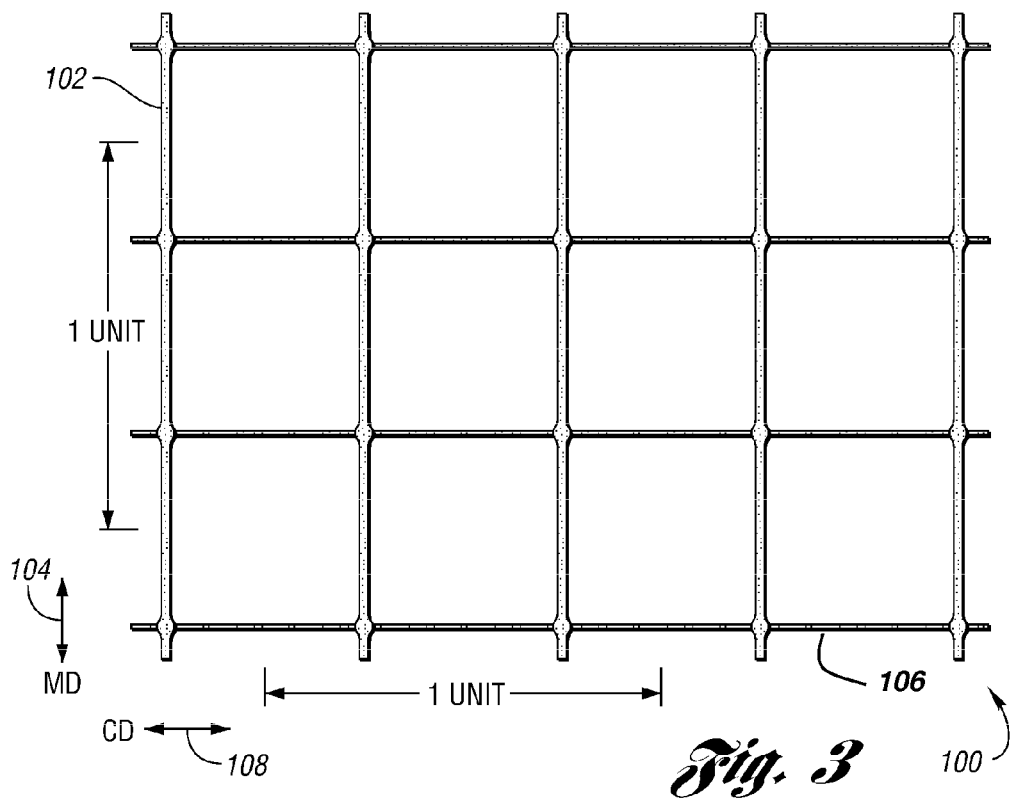
FIG. 3 is a top view of a uniaxially oriented plastic net according to an embodiment of the present invention.

In at least one embodiment, the plastic support net is an extruded, generally planar plastic net, oriented in one direction, i.e. uniaxially oriented, either the MD or CD, to obtain a plastic net for use as a filter medium support structure. FIG. 2 depicts a top view of an unoriented extruded plastic net 50, whereas FIG. 3 depicts a top view of an oriented extruded plastic net 100 formed by orienting the unoriented extruded plastic net 50 in the CD.

The unoriented extruded plastic net 50 includes MD strands 52 extending in the MD 54 and CD strands 56 extending in the CD 58.

As shown in FIG. 2, the CD strand count is 2 strands per unit and the MD strand count is 9.5 stands per unit, thereby providing a ratio of MD to CD strand count of 4.75. In certain embodiments, the MD strand count can be in the range of 0.5 to 40 overall strands per inch, and in other embodiments, 0.75 to 20 overall strands per inch, and in yet other embodiments, 1 to 15 overall strands per inch. In certain embodiments, the CD strand count can be in the range of 0.5 to 30 overall strands per inch, and in other embodiments, 5 to 25 overall strands per inch, and in yet other embodiments, 10 to 20 overall strands per inch. In certain embodiments, the ratio of CD to MD stand count can be in the range of 0.5:1 to 7:1.

It should be appreciated that any strand configuration made from cold pleatable materials can be used in accordance with certain embodiments of the present invention. For example, a biaxially oriented net can be used according to one or more embodiments of the present invention.

Turning to FIG. 3, the oriented plastic net 100 is formed by orienting the unoriented extruded plastic net 50 in the CD. The orientation step can be carried out by any method known to one of ordinary skill in the art. For example, the unoriented extruded plastic net 50 can be heated to an elevated temperature and then stretched in the orientation direction to achieve a pre-determined orientation ratio. The elevated temperature can be in the range of 175 to 350° F., and in other embodiments, 185 to 335° F., and in yet other embodiments, 200 to 320° F. In at least one embodiment, the elevated temperature is 240° F. The orientation ratio can be in the range of 2.5 to 9.0, and in other embodiments, 3.0 to 8.0, and in yet other embodiments, 3.5 to 7.0. In at least one embodiment, the orientation ratio is 4.60.

After the orientation step is completed, the oriented extruded plastic net 100 includes MD strands 102 extending in the MD 104 and CD strands 106 extending in the CD 108. The MD strand count is 2 strands per unit and the CD strand count is 2 strands per unit, thereby providing a ratio of CD to MD strand count of 1. In certain embodiments, the MD strand count can be in the range of 0.2 to 40 overall strands per inch, and in other embodiments, 0.5 to 20 overall strands per inch, and in yet other embodiments, 0.75 to 5 overall strands per inch. In certain embodiments, the CD strand count can be in the range of 0.2 to 40 overall strands per inch, and in other embodiments, 0.5 to 20 overall strands per inch, and in yet other embodiments, 0.75 to 5 overall strands per inch. In certain embodiments, the ratio of CD to MD stand count can be in the range of 1:1 to 15:1.

In at least one embodiment, the extruded plastic net is a biaxially oriented net. In certain embodiments, the MD strand count of a biaxially oriented net can be in the range of 0.25 to 12 overall strands per inch, and in other embodiments, 0.5 to 10 overall strands per inch, and in yet other embodiments, 1 to 8 overall strands per inch. In certain embodiments, the CD strand count can be in the range of 0.25 to 12 overall strands per inch, and in other embodiments, 0.5 to 10 overall strands per inch, and in yet other embodiments, 1 to 8 overall strands per inch.

In at least one embodiment, the strands 102 and 106 are made of the same material, i.e. 100% of the strands are made of the same material. In at least another embodiment, strands 102 are made of a different material than strands 106. In this embodiment, the netting may comprise 10 to 90 wt. % of the material comprising strands 102 and 90 to 10 wt. % of the material comprising strands 104. In other embodiments, the netting may comprise 35 to 65 wt. % of the material comprising strands 102 and 65 to 35 wt. % of the material comprising strands 106. In yet other embodiments, the netting may comprise 45 to 55 wt. % of the material comprising strands 102 and 55 to 45 wt. % of the material comprising strands 106.

In at least one embodiment, strands 102 and/or 106 are made of two or more materials. For example, strands 102 and 106 can be comprised of a first outer layer comprised of a first polymeric material, an inner layer comprised of a second polymeric material, and a second outer layer generally opposed to the first outer layer and comprised of a third polymeric material. In at least one embodiment, the inner layer is comprised of an HDPE and the first and second outer layers are comprised of a polymeric thermal adhesive, such as ethylene vinyl acetate (EVA). In such embodiments, the pleating operation can be carried out at a temperature that activates the thermal adhesive, but is less than the elevated temperature that may damage the heat sensitive filter medium material. For example, the adhesive activation temperature can be in the range of 100 to 180° F. and the elevated temperature can be greater than or equal to 180° F. Other examples of multi-polymeric component strands are found in U.S. Provisional Patent Application Serial No. 60/777,089, which is herein incorporated by reference.

In at least one embodiment, the material(s) used to make strands 102 and 106 have an ambient temperature pleatability characteristic, such that the material(s) can take and hold a pleat at an ambient temperature. In certain embodiments, the ambient temperature is in the range of 50° F. to 120° F. In at least one embodiment, the ambient temperature is 77° F. Ambient temperature pleatable materials can be utilized as pleated supports for filter media made of materials that are sensitive to elevated temperature heating operations. In certain embodiments, the elevated temperature can be greater than or equal to 120° F., and in other embodiments, the elevated temperature can be greater than or equal to 140° F., and in yet other embodiments, the elevated temperature can be greater than or equal to 200° F. For example, PP support nets are typically heated to an elevated temperature of 200° F. in order for the PP to take and hold a pleat, which may cause damage to many heat sensitive filter medium materials. According to at least one aspect of the present invention, the pleated plastic support and filter medium can be pleated at ambient conditions, thereby eliminating the damage associated with elevated temperature pleating operations performed on heat sensitive filter medium materials.

Any thermoplastic material that exhibits the ambient temperature pleatability characteristic can be used in accordance with the present invention, including, but not limited to an HDPE material or a PET material. In at least one embodiment, the HDPE material has a specific gravity in the range of 0.91 to 0.97.

In at least one embodiment, the HDPE has an average molecular weight (Mn) of 12,000-20,000, a weighted average molecular weight (Mw) of 90,000-130,000, a number average molecular weight (Mz) of 325,000-550,000, a peak average molecular weight (Mp) of 25,000-60,000, and a polydispersity index [(PDI) (Mw/Mn)] of 5.00-8.50.

In at least one embodiment, the HDPE has an average molecular weight (Mn) of 12,500-17,000, a weighted average molecular weight (Mw) of 92,000-100,000, a number average molecular weight (Mz) of 330,000-450,000, a peak average molecular weight (Mp) of 27,500-40,000, and a polydispersity index [(PDI) (Mw/Mn)] of 6.00-7.25.

In at least one embodiment, the HDPE has an average molecular weight (Mn) of 13,000-13,850, a weighted average molecular weight (Mw) of 93,000-95,500, a number average molecular weight (Mz) of 345,000-400,000, a peak average molecular weight (Mp) of 30,000-36,000, and a polydispersity index [(PDI) (Mw/Mn)] of 6.75-7.25.

In at least one embodiment, the HDPE has an average molecular weight (Mn) of 13,200-13,800, a weighted average molecular weight (Mw) of 94,000-95,000, a number average molecular weight (Mz) of 365,000-390,000, a peak average molecular weight (Mp) of 32,500-34,500, and a polydispersity index [(PDI) (Mw/Mn)] of 6.80-7.10.

In at least one embodiment, the HDPE has an average molecular weight (Mn) of 13,641, a weighted average molecular weight (Mw) of 94,543, a number average molecular weight (Mz) of 382,614, a peak average molecular weight (Mp) of 33,632, and a polydispersity index [(PDI) (Mw/Mn)] of 6.93.

In at least one embodiment, the HDPE has a melt flow index of 0.3-2.0 g/10 min. and a density of 0.940-0.965 g/cc. In at least another embodiment, the HDPE has a melt flow index of 0.75-1.25 g/10 min. and a density of 0.956-0.959 g/cc.

In at least one embodiment, the HDPE has a melt flow index of 0.85-1.05 g/10 min. and a density of 0.958 g/cc.

As shown in FIG. 3, the oriented plastic net 100 is only oriented in the CD, which concentrates the plastic weight and pleat holding force in the machine direction strands 102. It should be appreciated that an oriented plastic net can be uniaxially oriented in the MD according to other embodiments. It should be further appreciated that an oriented plastic net can be biaxially oriented according to embodiments of the present invention as long as the plastic weight and pleat holding force is concentrated in one direction.

The oriented plastic net 100 can be adjacent to a generally planar filter medium such that the MD strands 102 will be oriented in a direction substantially perpendicular to the longitudinal direction of the filter medium pleats after the pleating operation. During the pleating operation, the MD strands 102 are subjected to the bending steps (e.g. crimping, creasing, etc.) associated with the pleating operation. After the pleating operation, the MD strands 102, which are relatively stronger than the CD strands 106, are primarily responsible for holding the pleated shape of the pleated filter medium. By orienting in the CD only, the basis weight of the plastic support net can be reduced while maintaining the primary pleat holding power in the MD, which is aligned in a direction substantially perpendicular to the longitudinal direction of the filter medium pleats.

With respect to the oriented plastic net 100, the ratio of the MD strand weight to the total net weight of the plastic can be in the range of 0.51 to 0.85 in certain embodiments, and 0.60 to 0.80 in other embodiments, and 0.70 to 0.75 in yet other embodiments. The MD peak strength can be in the range of 1.3 to 25 lbs./strand in certain embodiments, and 5 to 20 lbs./strand in other embodiments, and 10 to 15 lbs./strand in yet other embodiments. The CD peak strength can be in the range of 2.5 to 45 lbs./strand in certain embodiments, and 10 to 35 lbs./strand in other embodiments, and 20 to 25 lbs./strand in yet other embodiments. In at least one embodiment, the peak strength can be tested using ASTM test method 5035. In certain embodiments of the present invention, the plastic support net has a strength to weight ratio of 0.5 to 2.0 lbf/(in*PMSF), and in other embodiments, 0.75 to 1.75 lbf/(in*PMSF), and in yet other embodiments 1.0 to 1.5 lbf/(in*PMSF). PMSF is an abbreviation for pounds per 1000 sq. ft.

The thickness (i.e. diameter) of the MD strands 102 can be in the range of 3 to 125 mils in certain embodiments, 20 to 100 mils in other embodiments, and 40 to 60 mils in yet other embodiments. The thickness of the CD strands 106 can be in the range of 1 to 50 mils in certain embodiments, 10 to 40 mils in other embodiments, and 20 to 30 mils in yet other embodiments.

With respect to biaxially oriented net, the MD peak strength can be in the range of 2.5 to 45 lbs./strand in certain embodiments, and 10 to 35 lbs./strand in other embodiments, and 20 to 25 lbs./strand in yet other embodiments and the CD peak strength can be in the range of 2.5 to 45 lbs./strand in certain embodiments, and 10 to 35 lbs./strand in other embodiments, and 20 to 25 lbs./strand in yet other embodiments. The biaxially oriented net can have a strength to weight ratio of 2.5 to 6.0 lbf/(in*PMSF), and in other embodiments, 3.0 to 5.0 lbf/(in*PMSF), and in yet other embodiments 4.0 to 4.5 lbf/(in*PMSF).

Figure 4:
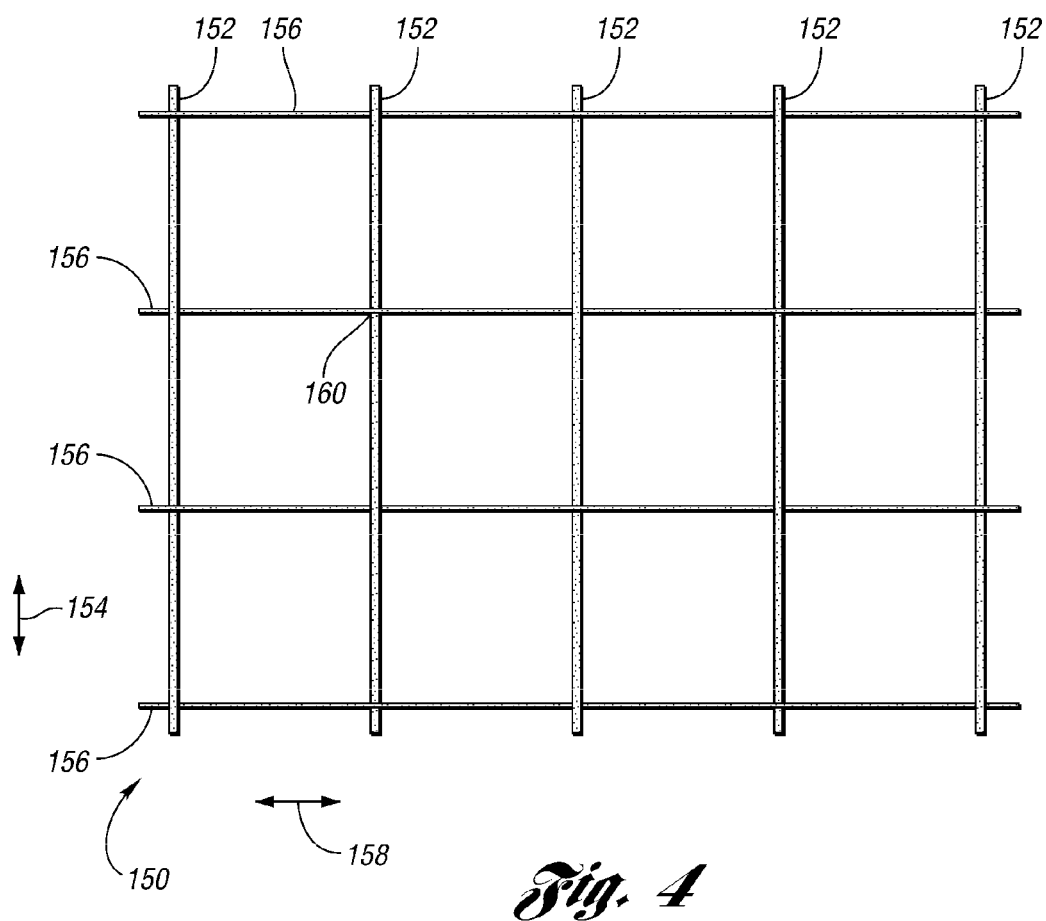
FIG. 4 is a top view of a plastic net according to another embodiment of the present invention.

FIG. 4 depicts a plastic net 150 that can be used as a filter medium support net according to another embodiment of the present invention. The plastic net 150 includes a number of strands 152 extending generally parallel to each other in a first direction 154. The plastic net 150 also includes a number of strands 156 extending generally parallel to each other in a second direction 158, which is generally perpendicular to the first direction 154.

In at least one embodiment, strands 152 are relatively thicker and heavier than strands 156. The thickness (i.e. diameter) of the strands 152 can be in the range of 3 to 125 mils in certain embodiments, 20 to 100 mils in other embodiments, and 40 to 60 mils in yet other embodiments. The thickness of the strands 156 can be in the range of 1 to 50 mils in certain embodiments, 10 to 40 mils in other embodiments, and 20 to 30 mils in yet other embodiments. In certain embodiments, the ratio of the weight of strands 152 to the total net weight of the plastic net can be in the range of 0.51 to 0.85 in certain embodiments, and 0.60 to 0.80 in other embodiments, and 0.70 to 0.75 in yet other embodiments.

Plastic net 150 can be made by extruding monofilaments of strands 152 and 154 and then cross laying or weaving strands 152 and 156 into the orientation depicted in FIG. 4. In certain embodiments, the strands 152 and 156 are loosely held together at intersections 160 without bonding, e.g. an adhesive. According to other embodiments, the strands 152 and 156 are bonded together with an adhesive at intersections 160.

In at least one embodiment, the material(s) used to make strands 152 and 156 have an ambient temperature pleatability characteristic, such that the material(s) can take and hold a pleat at an ambient temperature. In certain embodiments, the ambient temperature is in the range of 50° F. to 120° F. In at least one embodiment, the ambient temperature is 77° F. Any thermoplastic material that exhibits this characteristic can be used in accordance with the present invention, including, but not limited to an HDPE material or a PET material. In at least one embodiment, the HDPE material has a specific gravity in the range of 0.91 to 0.97.

The plastic net 150 and a filter medium can be pleated together in a single forming step as disclosed herein. After the forming operation, the relatively thicker and heavier strands 152 are oriented in a direction generally perpendicular to the longitudinal direction of the filter medium pleats and extend over the peak portions of opposing faces of adjacent filter medium pleats. According to this configuration, the weight and pleat holding force of the plastic support net is concentrated in the direction where it can be effective in holding the pleated shape of the filter medium.

The present invention may be further appreciated by consideration of the following, non-limiting example, and certain benefits of the present invention may be further appreciated by the example set forth below.

EXAMPLE 1

An extruded plastic netting is made at a basis weight of 41.5 lbs. per 1000 sq. ft. and a total width of 39 inches. The raw material composition is 24% 7194 HDPE from Fina, 75% Alathon(R) M6210 from Equistar Chemical Co. of Houston, Tex., and 1% process aid available from Standridge Color Corp. of Social Circle, Ga. The extruded plastic netting has a MD strand count of 9.5 strands per inch and a CD strand count of 2 strands per inch. The extruded netting has an MD average peak strength of 4.5 lbs./strand, and a CD average peak strength of 4.2 lbs./strand.

The extruded netting is subsequently oriented only in the CD by stretching the extruded netting in the CD at a temperature of 240° F., with an orientation ratio of 4.60. The resulting CD uniaxially oriented plastic netting has a MD strand count of 2 strands per inch and a CD strand count of 2 strands per inch. The extruded netting has a MD average peak strength of 3.0 lbs./strand, and a CD average peak strength of 5.4 lbs./strand. The resulting CD uniaxially oriented plastic netting is suitable for use as a pleated support net for a pleated filter medium as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A filter assembly for removing particulate matter from a fluid stream, the filter assembly comprising:
    a filter medium having a number of longitudinally extending spaced pleats, wherein opposing faces of adjacent pleats form a valley therebetween and include a pair of peak portions and a valley portion; and
    a plastic support net being pleated for supporting the filter medium in a pleated shape,
    the plastic support net including spaced strands extending in a first direction and spaced strands extending in a second direction generally transverse to the first direction, the spaced strands extending in the first direction continuously extending over the valley and peak portions of opposing faces of adjacent filter medium pleats and being aligned in a direction generally perpendicular to the longitudinal direction of the filter medium pleats, and the plastic support net being formed of a plastic material capable of being pleated into a pleated shape at an ambient temperature and substantially holding the pleated shape after the ambient pleating operation.

2. The filter assembly of claim 1, wherein the plastic support net forms a continuous space for flowing a fluid stream and bounded by the pair of peak portions and the valley portion.

3. The filter assembly of claim 2, wherein the plastic material is substantially comprised of a high-density polyethylene (HDPE) plastic material.

4. The filter assembly of claim 1, wherein the plastic support net is comprised of an extruded plastic net oriented in the second direction.

5. The filter assembly of claim 4, wherein the ratio of the weight of the strands extending in the first direction to the total weight of the plastic support net is in the range of 0.51 to 0.85.

6. The filter assembly of claim 1, wherein the filter medium is susceptible to heat damage upon heating the filter medium to a temperature of 120° F. or greater.

7. The filter assembly of claim 1, wherein the pleated shape of the plastic support net is adapted to mechanically hold the pleated shape of the filter medium without chemically bonding between the plastic support net and the filter medium or between the spaced strands in the second direction of adjacent plastic support net pleats.

8. The filter assembly of claim 1, wherein the plastic net is coupled to the pleated filter medium with an adhesive.

9. The filter assembly of claim 1, wherein the plastic support net is comprised of a woven plastic net, the strands extending in the first direction and the strands extending in the second direction are comprised of plastic monofilaments.

10. The filter assembly of claim 1, wherein the thickness of the strands extending in the second direction is in the range of 1 to 50 mils and the thickness of the strands extending in the first direction is in the range of 3 to 125 mils.

11. The filter assembly of claim 1, wherein the plastic support net is comprised of an extruded plastic net oriented in the first and second directions.

12. A plastic support net for supporting a filter medium having a number of longitudinally extending pleats, opposing faces of adjacent pleats forming a valley therebetween, and including a pair of peak portions and a valley portion, the plastic support net comprising:
    spaced strands extending in a first direction and spaced strands extending in a second direction generally transverse to the first direction bonded to the spaced strands extending in the first direction, the strands extending in the first direction continuously extending over the valley and peak portions of opposing faces of adjacent filter medium pleats and being aligned in a direction generally perpendicular to the longitudinal direction of the filter medium pleats, the plastic support net being pleated for supporting the pleated filter medium in a pleated shape, and the plastic support net being formed of a plastic material capable of being pleated into a pleated shape at an ambient temperature and substantially holding the pleated shape after the ambient pleating operation.

13. The plastic support net of claim 12, wherein the plastic support net forms a continuous space for flowing a fluid stream and bounded by the pair of peak portions and the valley portion.

14. The plastic support net of claim 13, wherein the plastic material is substantially comprised of a high-density polyethylene (HDPE) plastic material.

15. The plastic support net of claim 14, wherein the plastic support net is comprised of an extruded plastic net oriented in the second direction.

16. The plastic support net of claim 15, wherein the plastic support net has a strength to weight ratio of 0.5 to 2.0 lbf/ (in*PMSF).

17. The plastic support net of claim 16, wherein the ratio of the weight of the strands extending in the first direction to the total weight of the plastic support net is in the range of 0.51 to 0.85.

18. The plastic support net of claim 12, wherein the plastic support net is comprised of a woven plastic net, the strands extending in the first direction and the strands extending in the second direction are each comprised of plastic monofilaments, wherein the unit weight of the strands extending in the first direction is heavier than the unit weight of the strands extending in the second direction.

19. The plastic support net of claim 12, the plastic support net is comprised of an extruded plastic net oriented in the first and second directions.

20. A method for forming a pleated filter assembly, the method comprising of:
    providing a generally planar plastic net adjacent to a generally planar filter medium to obtain a generally planar filter assembly; and
    pleating the generally planar filter assembly at an ambient temperature to obtain a pleated filter assembly including a pleated filter medium for removing particulate matter from a fluid stream and having pleats extending in a longitudinal direction and a direction generally perpendicular to the longitudinal direction and a pleated plastic support net for holding the pleated filter medium in a pleated shape after the ambient temperature pleating operation.

21. The method of claim 20, wherein the ambient temperature is in the range of 50 to 100° F.

22. The method of claim 20, wherein the pleated plastic support net is made of a HDPE material.

23. The method of claim 20, further comprising:
    providing an extruded plastic net having an interconnecting network of machine direction (MD) strands and cross direction (CD) strands that extend transversely to the MD strands; and
    orienting the extruded plastic net in the CD to obtain an oriented, extruded plastic net for use as the generally planar plastic net and having relatively thick MD strands and relatively thin CD strands, and
    wherein the providing step comprises:
    aligning the oriented, extruded plastic net with the generally planar filter medium such that the relatively thick MD strands run along the generally perpendicular direction of the pleated filter medium after the pleating step.

* * * * *